(12) United States Patent
Damnjanovic et al.

(10) Patent No.: US 9,763,197 B2
(45) Date of Patent: Sep. 12, 2017

(54) COMPONENT CARRIER POWER CONTROL IN MULTI-CARRIER WIRELESS NETWORK

(75) Inventors: Jelena M. Damnjanovic, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 976 days.

(21) Appl. No.: 12/897,773

(22) Filed: Oct. 4, 2010

(65) Prior Publication Data

US 2011/0081939 A1 Apr. 7, 2011

Related U.S. Application Data

(60) Provisional application No. 61/248,816, filed on Oct. 5, 2009.

(51) Int. Cl.
| | |
|---|---|
| *H04B 7/00* | (2006.01) |
| *H04W 52/08* | (2009.01) |
| *H04W 52/14* | (2009.01) |
| *H04W 52/16* | (2009.01) |
| *H04W 52/54* | (2009.01) |
| *H04W 52/58* | (2009.01) |
| *H04W 52/34* | (2009.01) |

(52) U.S. Cl.
CPC ......... *H04W 52/08* (2013.01); *H04W 52/146* (2013.01); *H04W 52/16* (2013.01); *H04W 52/54* (2013.01); *H04W 52/58* (2013.01); *H04W 52/34* (2013.01)

(58) Field of Classification Search
CPC ............ H04B 7/00; H04W 72/04; H04Q 7/20
USPC .................. 455/509, 522, 456.1, 424, 426.1
See application file for complete search history.

(56) References Cited

U.S. PATENT DOCUMENTS

| | | | |
|---|---|---|---|
| 7,733,827 | B2 | 6/2010 | Kim et al. |
| 8,223,712 | B2 | 7/2012 | Kim et al. |
| 8,295,868 | B2 | 10/2012 | Zhang et al. |
| 8,989,208 | B2 | 3/2015 | Chen et al. |
| 2004/0038684 | A1 | 2/2004 | Sugaya |
| 2005/0053036 | A1 | 3/2005 | Takeda |

(Continued)

FOREIGN PATENT DOCUMENTS

| | | |
|---|---|---|
| CN | 101247171 A | 8/2008 |
| CN | 101465720 A | 6/2009 |

(Continued)

OTHER PUBLICATIONS

UE Transmitter Characteristics impact due to DC-HSUPU. Qualcomm Europe. 8th May 2009.*

(Continued)

*Primary Examiner* — Md Talukder

(57) ABSTRACT

Techniques for adjusting transmit power of component carriers in a multi-carrier wireless communication system are disclosed. A base station may determine a plurality of associations relating to one or more component carriers configured for use by a user equipment. The user equipment may receive downlink control information from the base station including one or more power control commands and may adjust a transmit power of its component carriers based on the associations. The user equipment may be notified of the associations either implicitly or explicitly.

40 Claims, 9 Drawing Sheets

(56) References Cited

U.S. PATENT DOCUMENTS

| | | | |
|---|---|---|---|
| 2005/0096076 A1* | 5/2005 | Gu | H04W 52/54 455/522 |
| 2005/0176437 A1* | 8/2005 | Mir | 455/450 |
| 2008/0214224 A1* | 9/2008 | Ostman | H04W 52/54 455/522 |
| 2009/0088148 A1 | 4/2009 | Chung et al. | |
| 2009/0219870 A1 | 9/2009 | Wengerter et al. | |
| 2010/0046412 A1 | 2/2010 | Varadarajan et al. | |
| 2010/0215011 A1 | 8/2010 | Pan et al. | |
| 2010/0227638 A1* | 9/2010 | Park | H04W 52/58 455/522 |
| 2010/0254329 A1* | 10/2010 | Pan | H04L 5/001 370/329 |
| 2010/0273515 A1* | 10/2010 | Fabien et al. | 455/509 |
| 2010/0279628 A1 | 11/2010 | Love et al. | |
| 2010/0296473 A1 | 11/2010 | Kim et al. | |
| 2010/0323744 A1* | 12/2010 | Kim | H04W 52/06 455/522 |
| 2011/0014922 A1* | 1/2011 | Jen | H04W 74/002 455/450 |
| 2011/0021154 A1 | 1/2011 | Marinier et al. | |
| 2011/0021228 A1 | 1/2011 | Kim et al. | |
| 2011/0038275 A1 | 2/2011 | Kim et al. | |
| 2011/0038331 A1 | 2/2011 | Chmiel et al. | |
| 2011/0044222 A1* | 2/2011 | Gerstenberger et al. | 370/311 |
| 2011/0044239 A1 | 2/2011 | Cai et al. | |
| 2011/0044259 A1 | 2/2011 | Nimbalker et al. | |
| 2011/0051681 A1 | 3/2011 | Ahn et al. | |
| 2011/0064042 A1 | 3/2011 | Kim et al. | |
| 2011/0070845 A1 | 3/2011 | Chen et al. | |
| 2011/0081936 A1* | 4/2011 | Haim et al. | 455/522 |
| 2011/0081939 A1* | 4/2011 | Damnjanovic | H04W 52/08 455/522 |
| 2011/0081940 A1* | 4/2011 | Gerstenberger et al. | 455/522 |
| 2011/0110441 A1 | 5/2011 | Chen et al. | |
| 2011/0134774 A1 | 6/2011 | Pelletier et al. | |
| 2011/0134877 A1 | 6/2011 | Noh et al. | |
| 2011/0151913 A1 | 6/2011 | Forster et al. | |
| 2011/0205995 A1 | 8/2011 | Groevlen | |
| 2011/0222629 A1 | 9/2011 | Lindh et al. | |
| 2011/0235607 A1 | 9/2011 | Haustein et al. | |
| 2011/0250918 A1* | 10/2011 | Jen | 455/509 |
| 2011/0280127 A1 | 11/2011 | Raaf et al. | |
| 2011/0299489 A1 | 12/2011 | Kim et al. | |
| 2011/0319121 A1* | 12/2011 | Jen | 455/522 |
| 2012/0009923 A1 | 1/2012 | Chen et al. | |
| 2012/0044882 A1* | 2/2012 | Kim | H04L 5/0058 370/329 |
| 2012/0044921 A1 | 2/2012 | Chung et al. | |
| 2012/0046064 A1* | 2/2012 | Baldemair et al. | 455/522 |
| 2012/0078933 A1 | 3/2012 | Kim et al. | |
| 2012/0127946 A1 | 5/2012 | Nishio et al. | |
| 2012/0163437 A1 | 6/2012 | Frederiksen et al. | |
| 2012/0176982 A1 | 7/2012 | Zirwas et al. | |
| 2012/0188962 A1 | 7/2012 | Gao et al. | |
| 2012/0208583 A1 | 8/2012 | Chung et al. | |
| 2012/0224553 A1* | 9/2012 | Kim | H04W 52/54 370/329 |
| 2013/0153298 A1 | 6/2013 | Pietraski et al. | |
| 2013/0286990 A1* | 10/2013 | Park | H04L 1/1861 370/329 |
| 2015/0092690 A1 | 4/2015 | Seo et al. | |

FOREIGN PATENT DOCUMENTS

| | | |
|---|---|---|
| CN | 101505498 A | 8/2009 |
| CN | 101998611 A | 3/2011 |
| EP | 1895697 A1 | 3/2008 |
| JP | 2003152671 A | 5/2003 |
| JP | 2005045504 A | 2/2005 |
| RU | 2313912 C2 | 12/2007 |
| RU | 2319307 C2 | 3/2008 |
| WO | WO-2008083804 A2 | 7/2008 |
| WO | WO-2008157797 | 12/2008 |
| WO | WO-2009021012 A2 | 2/2009 |
| WO | WO-2009041779 A1 | 4/2009 |
| WO | WO-2009048404 A1 | 4/2009 |
| WO | WO-2009057283 A1 | 5/2009 |
| WO | 2009099271 A1 | 8/2009 |
| WO | WO-2011021379 A1 | 2/2011 |

OTHER PUBLICATIONS

3rd Generation Partnership Project; Technical Specification Group Radio Access Network; Radio Resource Control (RRC); Protocol Specification (Release 8), 3GPP Standard; 3GPP TS 25.331, 3rd Generation Partnership Project (3GPP), Mobile Competence Centre; 650, Route Des Lucioles; F-06921 Sophia-Antipolis Cedex; France, No. V8.7.0, Jun. 1, 2009 (Jun. 1, 2009), pp. 1-1685, XP050368027, p. 575-pp. 579, 777 pp. 839-841.

International Search Report and Written Opinion—PCT/US2010/051536—ISA/EPO—May 9, 2011.

Qualcomm Europe: "UE Transmitter characteristics impact due to DC-HSUPA", 3GPP Draft; R4-091680_UE_TX_DC_HSUPA, 3rd Generation Partnership Project (3GPP), Mobile Competence Centre; 650, Route Des Lucioles; F-06921 Sophia-Antipolis Cedex; France, no. San Francisco; Apr. 27, 2009, Apr. 27, 2009 (Apr. 27, 2009), XP050342428.

3GPP: "3rd Generation Partnership Project, Technical Specification Group Radio Access Network, Evolved Universal Terrestrial Radio Access (E-UTRA), Physical layer procedures (Release 8)" 3GPP Draft, DRAFT36213-880, 3rd Generation Partnership Project (3GPP), Mobile Competence Centre, 650, Route Des Lucioles, F-06921 Sophia-Antipolis Cedex, France, Sep. 1, 2009 (Sep. 1, 2009), XP050388082.

Qualcomm Europe: "Interpreting the Carrier Indicator Field" 3GPP Draft, R1-094206 Interpretation of the Carrier Indicator Field, 3rd Generation Partnership Project (3GPP), Mobile Competence Centre, 650, Route Des Lucioles, F-06921 Sophia-Antipolis Cedex, France, no. Miyazaki, Oct. 12, 2009, Oct. 12, 2009 (Oct. 12, 2009), XP050388676.

Research in Motion et al.,"Carrier Indication for Carrier Aggregation" 3GPP Draft, R1-092417 (RIM-Carrier Indication for CA), 3rd Generation Partnership Project (3GPP), Mobile Competence Centre, 650, Route Des Lucioles, F-06921 Sophia-Antipolis Cedex, France, no. Los Angeles, USA, Jun. 24, 2009, Jun. 24, 2009 (Jun. 24, 2009), XP050350931.

ZTE: "Considerations on Carrier Indicator" 3GPP Draft, R1-093207 Considerations on Carrier Indicator, 3rd Generation Partnership Project (3GPP), Mobile Competence Centre , 650, Route Des Lucioles , F-06921 Sophia-Antipolis Cedex , France, no. Shenzhen, China, Aug. 19, 2009, Aug. 19, 2009 (Aug. 19, 2009), XP050351560.

Ericsson, "Carrier aggregation in LTE-Advanced", 3GPP Draft, R1-082468, 3rd Generation Partnership Project (3GPP), Mobile Competence Centre, 650, Route Des Lucioles, F-06921 Sophia-Antipolis Cedex, France, vol. RAN WGI, no. Warsaw, Poland, Jun. 30, 2008, Jun. 30, 2008 (Jun. 30, 2008), pp. 1-6, XP050110739.

ZTE: "Primary and Secondary PDCCH Design for LTE-A", 3GPP Draft; R1-091707, 3rd Generation Partnership Project (3GPP), Mobile Competence Centre, May 8, 2009 (May 8, 2009), pp. 1-12.

Research in Motion: "Carrier Indication for Carrier Aggregation," 3GPP TSG RAN WG1 Meeting #57b, R1-092417, Jun. 29, 2009, 3 Pages.

ZTE: "Considerations on Carrier Indicator", 3GPP TSG-RAN WG1 meeting #58, R1-093207, Aug. 24, 2009, 4 pages.

3GPP TSG RAN WG #58bis, Qualcomm Europe "UL Power Control for Multicarrier operation", R1-094209, Oct. 16, 2009.

3rd Generation Partnership Project; Technical Specification Group Radio Access Network; Evolved Universal Terrestrial Radio Access (E-UTRA); Physical layer procedures (Release 8) 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V8.7.0, May 1, 2009 (May 1, 2009), pp. 1-81, XP050377562 the whole document.

(56) References Cited

OTHER PUBLICATIONS

CATT: "Carrier indicator for LTE-A", 3GPP Draft; R1-094538, 3rd Generation Partnership Project (3GPP), Mobile Competence Centre; 650, Route Des Lucioles; F-06921 Sophia-Antipolis Cedex; France, no. Jeju; Nov. 9, 2009, Nov. 9, 2009 (Nov. 9, 2009), XP050388953.
MCC Support: "Draft Report of 3GPP TSG RAN WG1 #59 v0.2.0 (Jeju, South Korea, Nov. 9-13, 2009)", 3GPP Draft; Draft ReportWG1#59_V020, 3rd Generation Partnership Project (3GPP), Mobile Competence Centre ; 650, Route Des Lucioles ; F-06921 Sophia-Antipolis Cedex ; France, vol. RAN WG1, no. Valencia, Spain; Jan. 18, 2010, Nov. 19, 2009 (Nov. 19, 2009), XP050448942, p. 22-p. 38.
Panasonic: "Discussion on PDCCH with carrier indicator", 3GPP Draft; R1-094496, 3rd Generation Partnership Project (3GPP), Mobile Competence Centre, Nov. 9, 2009 (Nov. 9, 2009), pp. 1-3, XP050388917, France [retrieved on Nov. 2, 2009].
ZTE: "PDCCH designing issues for LTE-A", 3GPP Draft; R1-094736 PDCCH Designing Issues for LTE-A, 3rd Generation Partnership Project (3GPP), Mobile Competence Centre ; 650, Route Des Lucioles ; F-06921 Sophia-Antipolis Cedex ; France, no. Jeju; Nov. 9, 2009, Nov. 9, 2009 (Nov. 9, 2009), XP050389133.
3GPP TSG RAN WG1 Meeting #58, R1-093282, ASUSTeK: "Multi-Carrier UL power control for LTE-A", Aug. 28, 2009, pp. 1-40.
Alcatel-Lucent, "Control Channel Association for DL/UL Asymmetrical Carrier Aggregation," 3GPP TSG-RAN WG1 #58, R1-093361, Shenzhen, China, Aug. 24-28, 2009, 5 Pages.
LG Electronics: "PDCCH structure for multiple carrier aggregation in LTE-Advanced", 3GPP Draft; R1-092237 LTEA PDCCH Structure Rev, 3rd Generation Partnership Project (3GPP), Mobile Competence Centre ; 650, Route Des Lucioles ; F-06921 Sophia-Antipolis Cedex ; France, no. San Francisco, USA; May 8, 2009, May 8, 2009 (May 8, 2009), XP050339657, [retrieved on May 8, 2009].
Philips et al., "Corrections to Transmission Modes," 3GPP TSG-RAN WG1 Meeting #55bis, R1-090466, Ljubljana, Slovenia, Jan. 12-16, 2009, 25 Pages.
Texas Instruments : "Views on Cross-Carrier Resource Assignment," 3GPP TSG RAN WG1 # 58 R1-093595, Shenzhen, China, Aug. 24-Aug. 28, 2009, 2 pages.

\* cited by examiner

| DCI format | Scrambling | Search space | Carrier indicator |
|---|---|---|---|
| 0, 1, 1A, 1B, 1D, 2, 2A | C-RNTI | UE specific | Yes |
| 1C, 3, 3A | SI/P/RA-RNTI | Common | No |
| 0, 1A | Temporary C-RNTI, SI/P/RA-RNTI | Common | No |
| 0, 1A | C-RNTI | Common | Yes |

FIG. 9

| UL/DL scheduling information | CRC scrambled by different RNTIs |
|---|---|

FIG. 10

COMPONENT CARRIER POWER CONTROL IN MULTI-CARRIER WIRELESS NETWORK

CLAIM OF PRIORITY UNDER 35 U.S.C. §119

The present application for patent claims priority to U.S. Provisional Application No. 61/248,816, entitled, "Downlink Control Information For Multicarrier Operation," filed Oct. 5, 2009, and assigned to the assignee hereof and expressly incorporated herein by reference.

BACKGROUND

Field of the Invention

The present disclosure relates generally to communication, and more specifically to power control in a multi-carrier wireless communication network.

Background

The 3rd Generation Partnership Project (3GPP) Long Term Evolution (LTE) represents a major advance in cellular technology and is the next step forward in cellular 3G services as a natural evolution of Global System for Mobile Communications (GSM) and Universal Mobile Telecommunications System (UMTS). The LTE provides for an uplink speed of up to 50 megabits per second (Mbps) and a downlink speed of up to 100 Mbps and brings many technical benefits to cellular networks. The LTE is designed to meet carrier needs for high-speed data and media transport as well as high-capacity voice support well into this decade. Bandwidth is scalable from 1.25 MHz to 20 MHz. This suits the needs of different network operators that have different bandwidth allocations, and also allows operators to provide different services based on spectrum. The LTE is also expected to improve spectral efficiency in 3G networks, allowing carriers to provide more data and voice services over a given bandwidth.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

SUMMARY

In an aspect of the disclosure, a method for wireless communication is provided. The method generally includes receiving, at a user equipment (UE), control information comprising a group of transmit power control (TPC) commands, determining, based on a plurality of TPC indices, one or more TPC commands from the group to use for adjusting power of uplink transmissions on a corresponding plurality of component carriers, and adjusting a transmit power of one or more of the plurality of component carriers in accordance with the determined TPC commands.

In an aspect of the disclosure, a method for wireless communication is provided. The method generally includes determining an association between one or more transmit power control (TPC) indices and a plurality of component carriers, wherein each index is associated with at least one component carrier, and transmitting, to a user equipment (UE), control information comprising a group of transmit power control (TPC) commands, wherein locations of a plurality of TPC commands in the group for use by the UE for adjusting power of uplink transmissions on corresponding component carriers are selected based on the plurality of TPC indices.

In an aspect of the disclosure, a method for wireless communication is provided. The method generally includes determining, at a user equipment (UE), an association between one or more Radio Network Temporary Identifiers (RNTIs) and a plurality of component carriers, wherein each RNTI is associated with one or more component carriers, decoding, using one of the RNTIs, control information comprising one or more transmit power control (TPC) commands, and adjusting, in accordance with the one or more TPC commands, transmit power of the one or more component carriers associated with the RNTI used in the decoding.

In an aspect of the disclosure, a method for wireless communication is provided. The method generally includes determining an association between one or more Radio Network Temporary Identifiers (RNTIs) and a plurality of component carriers, wherein each RNTI is associated with one or more component carriers, and transmitting, to a user equipment (UE), control information comprising one or more transmit power control (TPC) commands, wherein the control information is transmitted using an RNTI selected to indicate to the UE the corresponding one or more component carriers whose power is to be adjusted in accordance with the TPC commands.

In an aspect of the disclosure, a method for wireless communication is provided. The method generally includes receiving, at a user equipment (UE), a downlink control information (DCI) message comprising one or more transmit power control (TPC) commands, determining one or more TPC commands in the DCI message to use for adjusting power of uplink transmissions on a corresponding plurality of component carriers, and adjusting transmit power of the plurality of component carriers in accordance with the determined TPC commands.

In an aspect of the disclosure, a method for wireless communication is provided. The method generally includes generating control information comprising one or more transmit power control (TPC) commands for adjusting power of uplink transmissions on a corresponding plurality of component carriers assigned to a user equipment, and transmitting the control information to the UE in a downlink control information (DCI) message.

In an aspect of the disclosure, an apparatus for wireless communication is provided. The apparatus generally includes means for receiving, at a user equipment (UE), control information comprising a group of transmit power control (TPC) commands, means for determining, based on a plurality of TPC indices, one or more TPC commands from the group to use for adjusting power of uplink transmissions on a corresponding plurality of component carriers, and means for adjusting a transmit power of one or more of the plurality of component carriers in accordance with the determined TPC commands.

In an aspect of the disclosure, an apparatus for wireless communication is provided. The apparatus generally includes means for determining an association between one or more transmit power control (TPC) indices and a plurality of component carriers, wherein each index is associated with at least one component carrier, and means for transmitting, to a user equipment (UE), control information comprising a group of transmit power control (TPC) commands, wherein locations of a plurality of TPC commands in the group for use by the UE for adjusting power of uplink transmissions on corresponding component carriers are selected based on the plurality of TPC indices.

In an aspect of the disclosure, an apparatus for wireless communication is provided. The apparatus generally includes means for determining, at a user equipment (UE), an association between one or more Radio Network Temporary Identifiers (RNTIs) and a plurality of component carriers, wherein each RNTI is associated with one or more component carriers, means for decoding, using one of the RNTIs, control information comprising one or more transmit power control (TPC) commands, and means for adjusting, in accordance with the one or more TPC commands, transmit power of the one or more component carriers associated with the RNTI used in the decoding.

In an aspect of the disclosure, an apparatus for wireless communication is provided. The apparatus generally includes means for determining an association between one or more Radio Network Temporary Identifiers (RNTIs) and a plurality of component carriers, wherein each RNTI is associated with one or more component carriers, and means for transmitting, to a user equipment (UE), control information comprising one or more transmit power control (TPC) commands, wherein the control information is transmitted using an RNTI selected to indicate to the UE the corresponding one or more component carriers whose power is to be adjusted in accordance with the TPC commands.

In an aspect of the disclosure, an apparatus for wireless communication is provided. The apparatus generally includes means for receiving, at a user equipment (UE), a downlink control information (DCI) message comprising one or more transmit power control (TPC) commands, means for determining one or more TPC commands in the DCI message to use for adjusting power of uplink transmissions on a corresponding plurality of component carriers, and means for adjusting transmit power of the plurality of component carriers in accordance with the determined TPC commands.

In an aspect of the disclosure, an apparatus for wireless communication is provided. The apparatus generally includes means for generating control information comprising one or more transmit power control (TPC) commands for adjusting power of uplink transmissions on a corresponding plurality of component carriers assigned to a user equipment, and means for transmitting the control information to the UE in a downlink control information (DCI) message.

In an aspect of the disclosure, an apparatus for wireless communication is provided. The apparatus generally includes at least one processor configured to receive, at a user equipment (UE), control information comprising a group of transmit power control (TPC) commands, determine, based on a plurality of TPC indices, one or more TPC commands from the group to use for adjusting power of uplink transmissions on a corresponding plurality of component carriers, and adjust a transmit power of one or more of the plurality of component carriers in accordance with the determined TPC commands, and a memory coupled to the at least one processor.

In an aspect of the disclosure, an apparatus for wireless communication is provided. The apparatus generally includes at least one processor configured to determine an association between one or more transmit power control (TPC) indices and a plurality of component carriers, wherein each index is associated with at least one component carrier, and transmit, to a user equipment (UE), control information comprising a group of transmit power control (TPC) commands, wherein locations of a plurality of TPC commands in the group for use by the UE for adjusting power of uplink transmissions on corresponding component carriers are selected based on the plurality of TPC indices, and a memory coupled to the at least one processor.

In an aspect of the disclosure, an apparatus for wireless communication is provided. The apparatus generally includes at least one processor configured to determine, at a user equipment (UE), an association between one or more Radio Network Temporary Identifiers (RNTIs) and a plurality of component carriers, wherein each RNTI is associated with one or more component carriers, decoding, using one of the RNTIs, control information comprising one or more transmit power control (TPC) commands, and adjust, in accordance with the one or more TPC commands, transmit power of the one or more component carriers associated with the RNTI used in the decoding, and a memory coupled to the at least one processor.

In an aspect of the disclosure, an apparatus for wireless communication is provided. The apparatus generally includes at least one processor configured to determine an association between one or more Radio Network Temporary Identifiers (RNTIs) and a plurality of component carriers, wherein each RNTI is associated with one or more component carriers, and transmit, to a user equipment (UE), control information comprising one or more transmit power control (TPC) commands, wherein the control information is transmitted using an RNTI selected to indicate to the UE the corresponding one or more component carriers whose power is to be adjusted in accordance with the TPC commands, and a memory coupled to the at least one processor.

In an aspect of the disclosure, an apparatus for wireless communication is provided. The apparatus generally includes at least one processor configured to receive, at a user equipment (UE), a downlink control information (DCI) message comprising one or more transmit power control (TPC) commands, determine one or more TPC commands in the DCI message to use for adjusting power of uplink transmissions on a corresponding plurality of component carriers, and adjust transmit power of the plurality of component carriers in accordance with the determined TPC commands, and a memory coupled to the at least one processor.

In an aspect of the disclosure, an apparatus for wireless communication is provided. The apparatus generally includes at least one processor configured to determine control information comprising one or more transmit power control (TPC) commands for adjusting power of uplink transmissions on a corresponding plurality of component carriers assigned to a user equipment, and transmit the control information to the UE in a downlink control information (DCI) message, and a memory coupled to the at least one processor.

In an aspect of the disclosure, a computer-program product for wireless communications is provided, comprising a computer readable medium having instructions stored thereon, the instructions being executable by one or more processors. The instructions generally include instructions for receiving, at a user equipment (UE), control information comprising a group of transmit power control (TPC) commands, instructions for determining, based on a plurality of TPC indices, one or more TPC commands from the group to use for adjusting power of uplink transmissions on a corresponding plurality of component carriers, and instructions for adjusting a transmit power of one or more of the plurality of component carriers in accordance with the determined TPC commands.

In an aspect of the disclosure, a computer-program product for wireless communications is provided, comprising a computer readable medium having instructions stored thereon, the instructions being executable by one or more processors. The instructions generally include instructions for determining an association between one or more transmit power control (TPC) indices and a plurality of component carriers, wherein each index is associated with at least one component carrier, and instructions for transmitting, to a user equipment (UE), control information comprising a group of transmit power control (TPC) commands, wherein locations of a plurality of TPC commands in the group for use by the UE for adjusting power of uplink transmissions on corresponding component carriers are selected based on the plurality of TPC indices.

In an aspect of the disclosure, a computer-program product for wireless communications is provided, comprising a computer readable medium having instructions stored thereon, the instructions being executable by one or more processors. The instructions generally include instructions for determining, at a user equipment (UE), an association between one or more Radio Network Temporary Identifiers (RNTIs) and a plurality of component carriers, wherein each RNTI is associated with one or more component carriers, instructions for decoding, using one of the RNTIs, control information comprising one or more transmit power control (TPC) commands, and instructions for adjusting, in accordance with the one or more TPC commands, transmit power of the one or more component carriers associated with the RNTI used in the decoding.

In an aspect of the disclosure, a computer-program product for wireless communications is provided, comprising a computer readable medium having instructions stored thereon, the instructions being executable by one or more processors. The instructions generally include instructions for determining an association between one or more Radio Network Temporary Identifiers (RNTIs) and a plurality of component carriers, wherein each RNTI is associated with one or more component carriers, and instructions for transmitting, to a user equipment (UE), control information comprising one or more transmit power control (TPC) commands, wherein the control information is transmitted using an RNTI selected to indicate to the UE the corresponding one or more component carriers whose power is to be adjusted in accordance with the TPC commands.

In an aspect of the disclosure, a computer-program product for wireless communications is provided, comprising a computer readable medium having instructions stored thereon, the instructions being executable by one or more processors. The instructions generally include instructions for receiving, at a user equipment (UE), a downlink control information (DCI) message comprising one or more transmit power control (TPC) commands, instructions for determining one or more TPC commands in the DCI message to use for adjusting power of uplink transmissions on a corresponding plurality of component carriers, and instructions for adjusting transmit power of the plurality of component carriers in accordance with the determined TPC commands.

In an aspect of the disclosure, a computer-program product for wireless communications is provided, comprising a computer readable medium having instructions stored thereon, the instructions being executable by one or more processors. The instructions generally include instructions for determining control information comprising one or more transmit power control (TPC) commands for adjusting power of uplink transmissions on a corresponding plurality of component carriers assigned to a user equipment, and instructions for transmitting the control information to the UE in a downlink control information (DCI) message.

BRIEF DESCRIPTION OF THE DRAWINGS

FIG. 9 illustrates a table of example downlink control information (DCI) formats, in accordance with certain aspects of the present disclosure.

FIG. 10 illustrates an example downlink control information message scrambled by radio network temporary identifier, in accordance with certain aspects of the present disclosure.

DETAILED DESCRIPTION

Figure 1:
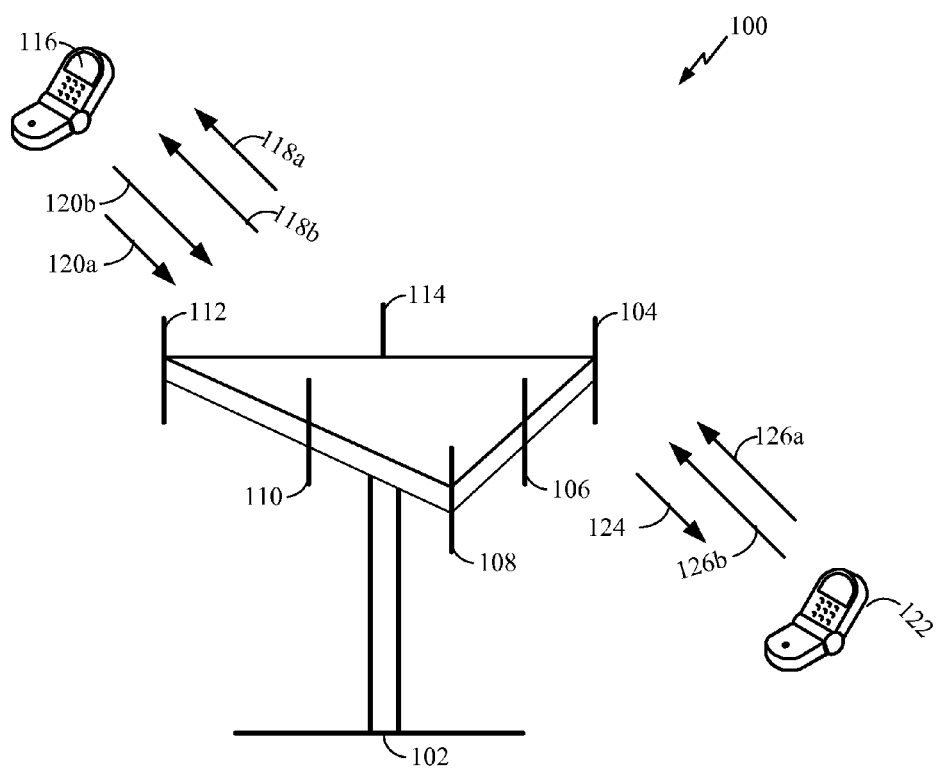
FIG. 1 illustrates a multi-carrier multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It will be recognized, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB (eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization has similar performance and essentially the same overall complexity as those of OFDMA system. SC-FDMA signal has lower peak-to-average power ratio (PAPR) because of its inherent single carrier structure. SC-FDMA has drawn great attention, especially in uplink communications where lower PAPR benefits the mobile terminal in terms of transmit power efficiency.

Referring to FIG. 1, a multi-carrier wireless communication system 100 according to one aspect of the present disclosure is illustrated. An access point 102 (AP) includes multiple antenna groups, one including 104 and 106, another including 108 and 110, and an additional one including 112 and 114 for communicating with user equipment (UEs) 116, 122. Access point 102 may be a fixed station and may be referred to as a base station, Node B, an evolved Node B (eNB) or some other terminology.

UEs 116, 122 can be wireless terminals or other devices as previously indicated. As shown, a first user equipment (UE) 116 communicates with access point 102 via multiple uplink 120 and downlink carriers 118 (also referred to as "component carriers" or "CCs"). In particular, UE 116 receives data transmissions on two downlink carriers 118a, 118b and transmits on two uplink carriers 120a, 120b. A second UE 122 is configured with one downlink carrier 124 and two uplink carriers 126a, 126b. Wireless communication system 100 may include additional access points and UEs (not shown) and each UE may be individually configured with downlink and uplink component carriers for multi-carrier operation. It will be recognized that such configurations can be symmetric (one downlink carrier for each uplink carrier) or asymmetric.

As will be described in greater detail below, the access point 102 may send Transmit Power Control (TPC) commands to UEs 116, 122 to adjust the power utilized in uplink transmissions on their respective component carriers. For certain aspects, the access point 102 notifies UEs of the component carriers corresponding to the TPC commands, either implicitly or explicitly. For example, higher layer signaling may be utilized to inform a UE of one or more TPC indices corresponding to the uplink carriers assigned for use by the UE. A UE may also receive an indication of the carriers corresponding to each TPC command in a downlink control information message.

Figure 2:
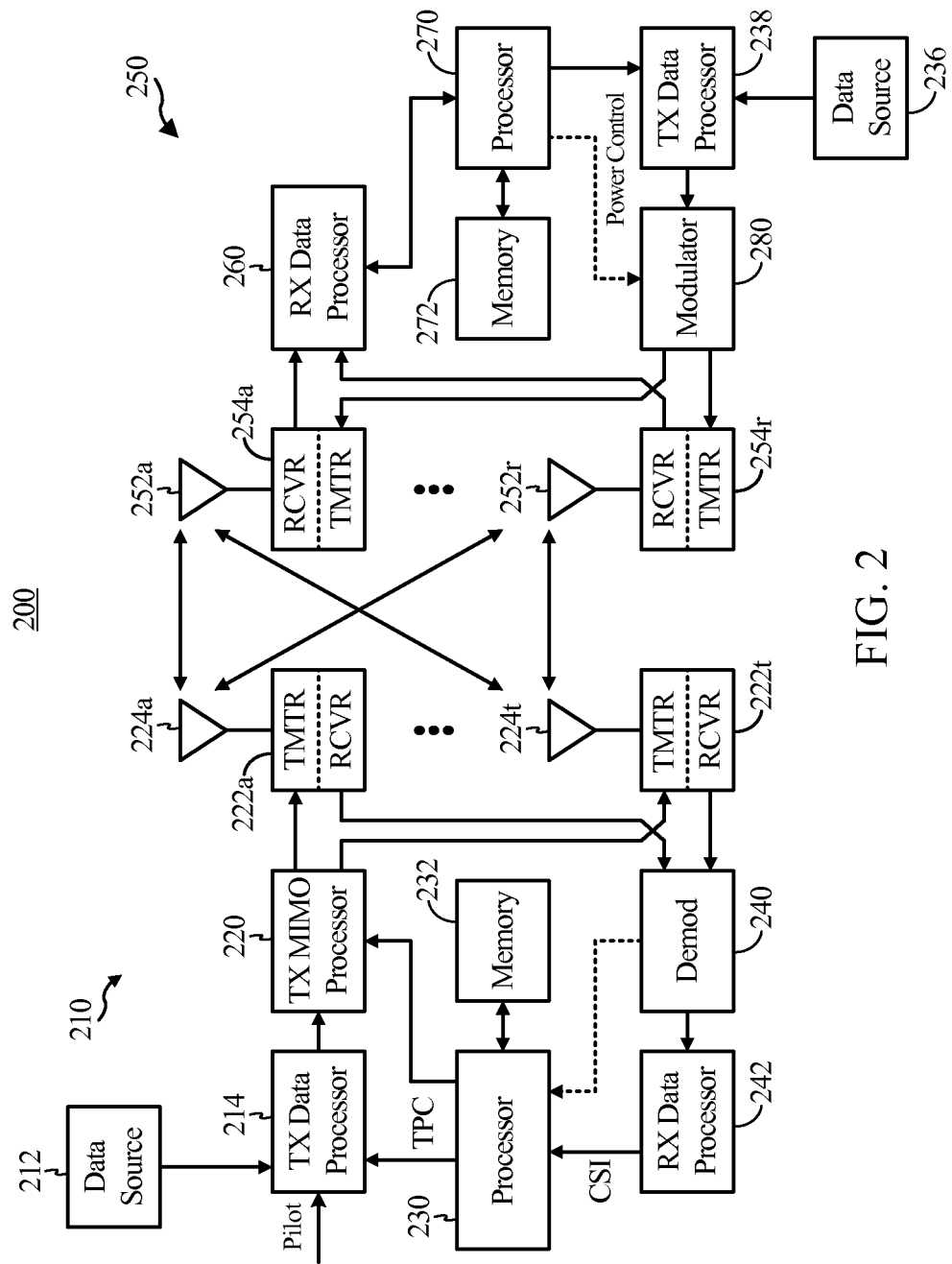
FIG. 2 illustrates a block diagram of multiple input multiple output (MIMO) communication system, in accordance with certain aspects of the present disclosure.

FIG. 2 is a block diagram 200 showing an exemplary base station 210 and access terminal 250 in a multi-carrier wireless communication system 200. The base station 210 can be an access point such as access point 102 and the access terminal 250 can be a user equipment such as UE 116.

At the transmitter 210, traffic data for a number of data streams is provided from a data source 212 to a transmit (TX) data processor 214. A processor 230 generates control information, including transmit power control (TPC) commands relating to one or more uplink carriers, for inclusion with the downlink transmission. A TX data processor 214 formats, codes, and interleaves the traffic data for each data stream based on a particular coding scheme selected for that data stream to provide coded data. The coded data for the data streams and control information may be multiplexed with pilot data using OFDM techniques.

The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M is generally a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Transmitters 222 receive and processes symbol streams for each downlink component carrier to provide one or more analog signals, and further condition (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At the access terminal 250, the transmitted modulated signals for the downlink component carriers are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream for each configured component carrier to recover the traffic data and control information, including the TPC commands. Various techniques for transmitting TPC commands for adjusting the power of uplink component carriers are discussed herein with reference to FIGS. 3-14.

The processing by RX data processor 260 may be complementary to that performed by TX MIMO processor 220 and TX data processor 214 at transmitter system 210. A processor 270, coupled to a memory 272, periodically determines which pre-coding matrix to use (discussed below). Processor 270 formulates an uplink link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r. Based on the TPC commands received with the downlink control information, processor 270 may also adjust the transmit power of one or more of its uplink component carriers.

At transmitter system 210, the power adjusted uplink component carriers from receiver system 250 are received by antennas 224, conditioned by receivers 222, demodulated by a demodulator 240 and processed by a RX data processor 242 to extract the reserve link message transmitted by the receiver system 250. Processor 230 can then determine which pre-coding matrix to use for determining the beamforming weights and continue processing the extracted message.

Component carriers in a multi-carrier system may be located in different frequency bands and may experience different channel characteristics. Under different interference scenarios, even contiguous bandwidths in heterogeneous network deployments may utilize different operating points and place different requirements on the UE transmit power. To accommodate operation in separate frequency bands and to provide flexibility for managing interference, it may be desirable to adjust uplink power on a per-UL component carrier basis.

In accordance with the present disclosure, one or more uplink carriers may be assigned to a UE capable of multi-carrier operation (e.g., a UE operating in compliance with developing LTE standards) and each UL component carrier may separately identified for purposes of power control. Certain specific aspects of the disclosure provide mapping rules for power control commands appropriate for symmetric/asymmetric UL/DL carrier configurations with or without cross-carrier operation.

In the long term evolution (LTE) standard, power control commands for the physical uplink shared channel (PUSCH) are conveyed in uplink (UL) grant messages, and power control commands for physical uplink control channel (PUCCH) are conveyed in downlink (DL) grant messages. Group power control commands for PUSCH and PUCCH may also be transmitted using the downlink control information (DCI) formats 3/3A. The UL/DL grants transmitted on a DL carrier may carry the TPC commands relating to a UL carrier paired with the DL carrier, or possibly relating to a different UL carrier.

For example, with cross-carrier operation, the UL grant message may carry TPC commands for PUSCH power control for a UL carrier as indicated by a carrier indicator field in the UL grant. Similarly, for PUCCH power control, the DL grant may carry TPC commands for the UL carrier that is indicated by a carrier indicator field in the DL grant. In cases where the downlink control information does not include a carrier indicator, a mapping or association between component carriers and other control information may be used.

In an asymmetric carrier configuration, where $N_{DL}>N_{UL}$ ($N_{DL}$ represents number of downlink carriers and $N_{UL}$ represents number of uplink carriers), a simple pairing of UL/DL carriers may not be possible. Therefore, there may be a need to transmit TPC commands for multiple UL carriers via a single DL carrier. In one aspect, additional bits may be transmitted in the TPC command for an asymmetric configuration in which the number of UL carriers is larger than the number of DL carriers. In another aspect, the TPC command in a DL grant message may correspond to a UL carrier on which PUCCH feedback is expected. In still another aspect, one TPC may be applicable to all the UL carriers corresponding to the DL carrier carrying the grant message.

Figure 3:
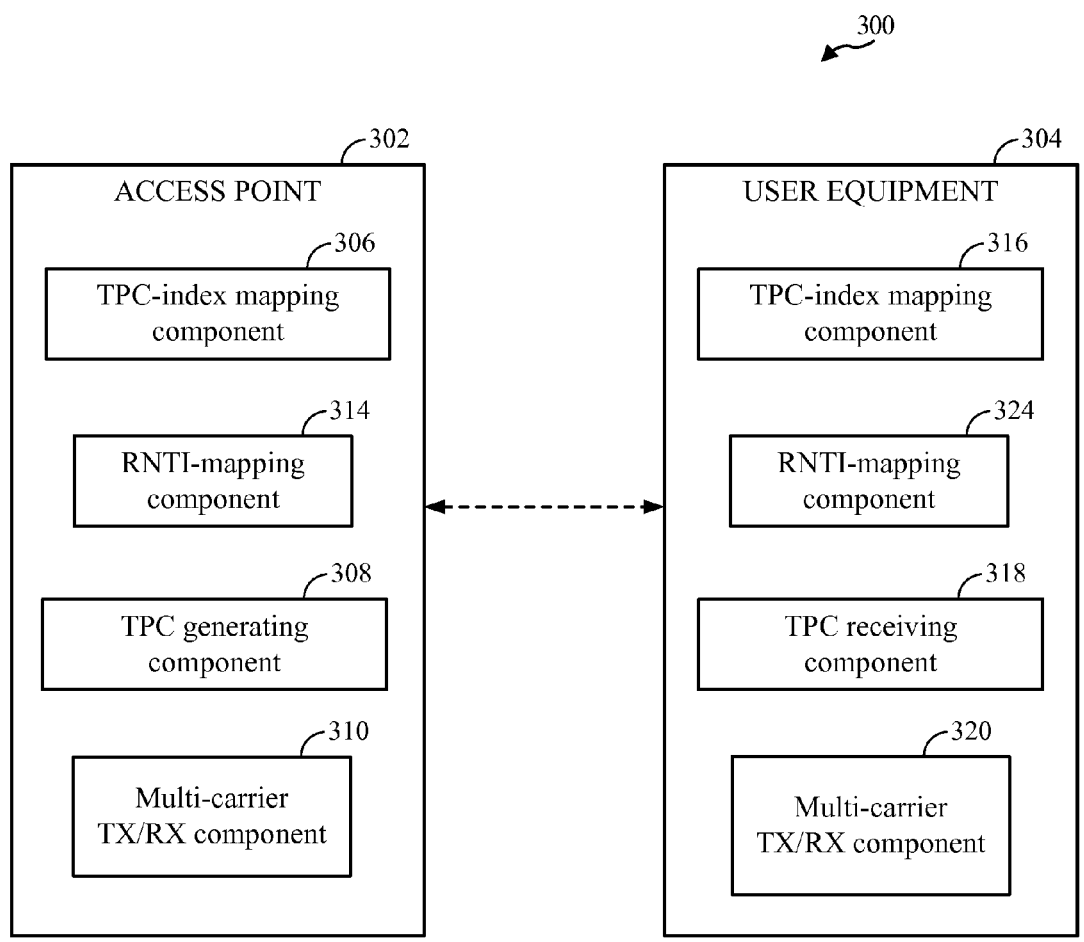
FIG. 3 illustrates an example wireless communication system, in accordance with certain aspects of the present disclosure.

FIG. 3 illustrates an example communication system 300 which provides transmit power control for a plurality of uplink CCs in a multi-carrier system, in accordance with certain aspects of the present disclosure. As illustrated, the communication system 300 may comprise an access point 302 and one or more user equipments 304, each of which may be as described in connection with FIGS. 1-2. For multi-carrier operation, the access point 302 may generate power control information for each component carrier of the UE 304 and transmit the TPC information to the UE.

According to certain aspects, the access point 302 may send information regarding the mapping of TPC commands and the component carriers to the UE 304. These mappings may allow the UE 304 to determine to which components carrier(s) a received TPC applies. As an example, the access point 302 may send indices or identifiers for each component carrier, from which the UE 304 may identify the mapping between each of the power control commands and the component carriers. The UE 304 may then utilize the TPC commands to adjust transmission power on each of the component carriers. Advantageously, in the presently described embodiment, utilizing mappings and identifiers does not require changing the size of downlink control information or use of new DCI formats.

In one aspect, a set of indices pointing to TPC commands in a group power control message may be mapped to (or associated with) a plurality of UL component carriers. The access point 302 may include a TPC-index mapping component 306 which provides an association between one or more tpc-indices to a group power control command and one or more UL component carriers configured for use by the user equipment 304.

Access point 302 also includes a TPC generating component 308 that generates TPC commands for adjusting the power of one or more UL carriers based on the mapping from TPC-index mapping component 306. Also included as part of access point 302 is a multi-carrier transceiver component 320. The multi-carrier transceiver 320 transmits signals, including the TPC commands, on one or more DL carriers and can receive signals from the UE 304 for which the transmit power has been adjusted according to TPC commands.

As illustrated, the UE 304 may include components for performing complementary processing to the components shown in the access point 302. For example, the UE 304 may include a TPC-index mapping component 316, a TPC receiving component 318, and a multi-carrier transceiver component 320. The TPC-index mapping component 316 maintains an association between one or more tpc-indices assigned to the UE from the access point 302 and one or more UL component carriers. The TPC receiving component 318 receives downlink control information from the access point 302 comprising one or more TPC commands. Using the carrier-specific mapping from TPC-index mapping component 316, the TPC receiving component 381 obtains power control information from the downlink transmission and adjusts the transmit power of one or more UL component carriers. The multi-carrier transceiver component 320 transmits a signal on a control or data channel of an uplink component carrier with the adjusted transmit power.

Access point 302 also includes an RNTI mapping component 314. RNTI mapping component 314 provides a further means of associating TPC commands with UL component carriers. In one aspect, the RNTI mapping component 314 maintains an association between one or more Radio Network Temporary Identifiers (RNTIs) and one or more component carriers configured for use by user equipment 304. The mapping or association can also be extended to groups of UEs. For example, RNTI mapping component 314 can maintain an association between a single RNTI and one or more component carriers utilized by members of a UE group.

TPC generating component 308 can use an RNTI mapped to a UL component carrier (or carriers) to prepare a TPC command. For example, in one aspect, TPC generating component 308 adds a power control command targeting a particular UL component carrier to downlink control information (such as a DL assignment or a UL grant) that is transmitted to user equipment 304. TPC generating component 308 scrambles cyclic redundancy information generated for the DCI message with the RNTI associated with the target UL carrier(s).

User equipment 304 includes a complimentary RNTI mapping component 324. When a downlink signal is received at multi-carrier TX/RX component 320, the UE 304 may attempt to decode downlink control information using one or more of the RNTIs associated with its configured uplink component carriers. If a downlink control message is successfully decoded, the TPC receiving component 318 determines the UL carrier to receive the TPC command based on the mapping and adjusts its transmit power at multi-carrier transceiver component 320.

It will be appreciated that TPC-index mapping and RNTI mapping may be combined in communication system 300. For example, the RNTI mapping component 324 may be configured with multiple RNTIs each of which defines a grouping of UL component carriers for use by user equipment 304. The TPC-index mapping component 316 may maintain a plurality of tpc-indexes for each group of carriers that is defined by an RNTI. For example, UE 304 may be configured with a first RNTI (e.g., TPC-PUSCH-RNTI$_1$) with tpc-Index$_1$ and tpc-Index$_2$ corresponding to first and second UL component carriers, and also with a second RNTI (e.g., TPC-PUSCH-RNTI$_2$) with tpc-Index$_3$ corresponding to a third carrier.

The combination of RNTI mapping and tpc-index mapping offers flexibility in conveying group TPC commands for multiple carriers. It allows different carriers to be updated on different time instances, adapting to the possibly different power control needs. If it is describable to update all carriers at the same time, the access point 302 may configure the user equipment with only a single TPC-PUCCH-RNTI/TPC-PUSCH-RNTI with appropriate tpc-indexes.

Figure 4:
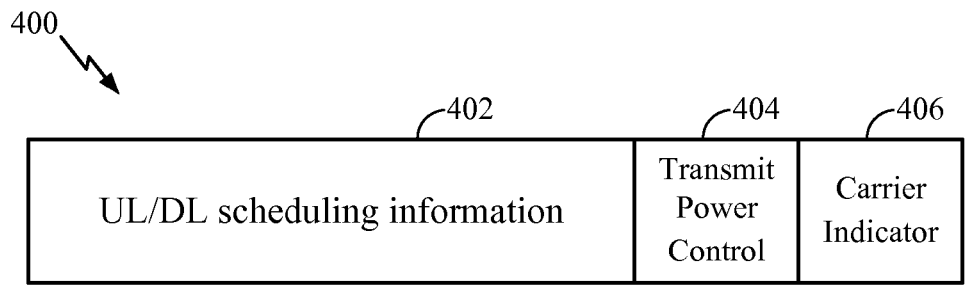
FIGS. 4 and 5 illustrate example message formats for carrying power control information, in accordance with certain aspects of the present disclosure.
Figure 5:
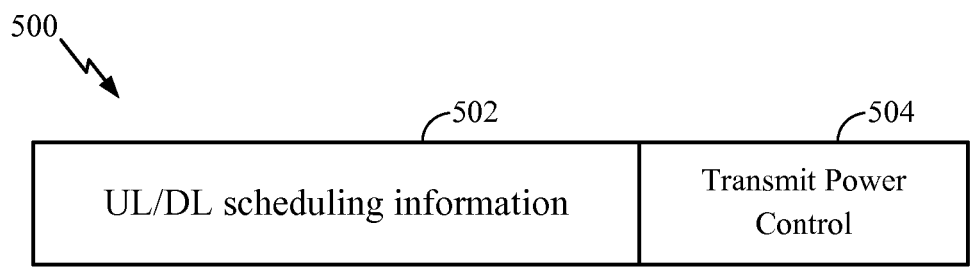

FIGS. 4 and 5 illustrate example downlink control information messages comprising transmit power control commands for UL component carriers in a multicarrier communication system, in accordance with certain aspects of the present disclosure. The exemplary downlink control information messages 400, 500 may be utilized in connection with communication system 300.

As illustrated in FIG. 4, message 400 may include a DL/UL scheduling information field 402, which may comprise any of the DCI formats in the LTE standard or other formats. The message may also include a transmit power control field 404 and a carrier indicator field 406. In some aspects, the carrier indicator field 406 may be added by the TPC generating component 308 of access point 302, and may explicitly indicate the carrier on which the transmit power control command 404 should be applied. The carrier indicator field 406 may be processed by TPC receiving component 318 and used to adjust transmit power on the indicated carrier.

As illustrated in FIG. 5, message 500 may include a DL/UL scheduling information field 502 and a transmit power control field 504. Unlike the message illustrated in FIG. 4, message 500 does not include a carrier indicator field. In place of carrier indicator field 406, higher layer signaling may be used to configure the UE with indices of the TPC commands and their corresponding carriers for cross-carrier operation and to direct the respective operations of TPC generating component 308 and TPC receiving component 318. Higher layer signaling may refer to the signals transmitted by higher layers in a protocol stack, such as radio link control (RLC) layer.

Figure 6:
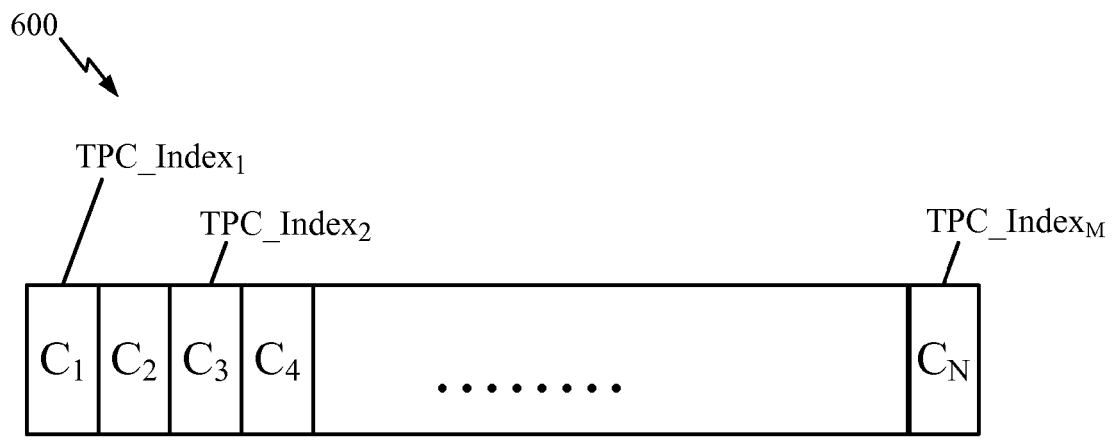
FIG. 6 illustrates an example mapping of a plurality of carriers to a plurality of power control indices, in accordance with certain aspects of the present disclosure.

As described above, according to certain aspects, a set of indices may be mapped to different component carriers and used to identify corresponding TPC commands. FIG. 6 illustrates an example mapping 600 between transmit power indices and component carriers, in accordance with certain aspects of the present disclosure. As illustrated, the component carrier c1 may be associated with tpc_index1, component carrier c3 may be associated with tpc_index2 and so on. In one embodiment, mapping 600 may be determined by TPC-index mapping component 306 at access point 302 and communicated via higher layer signaling to user equipment 304 for configuring TPC-index mapping component 316.

Figure 7:
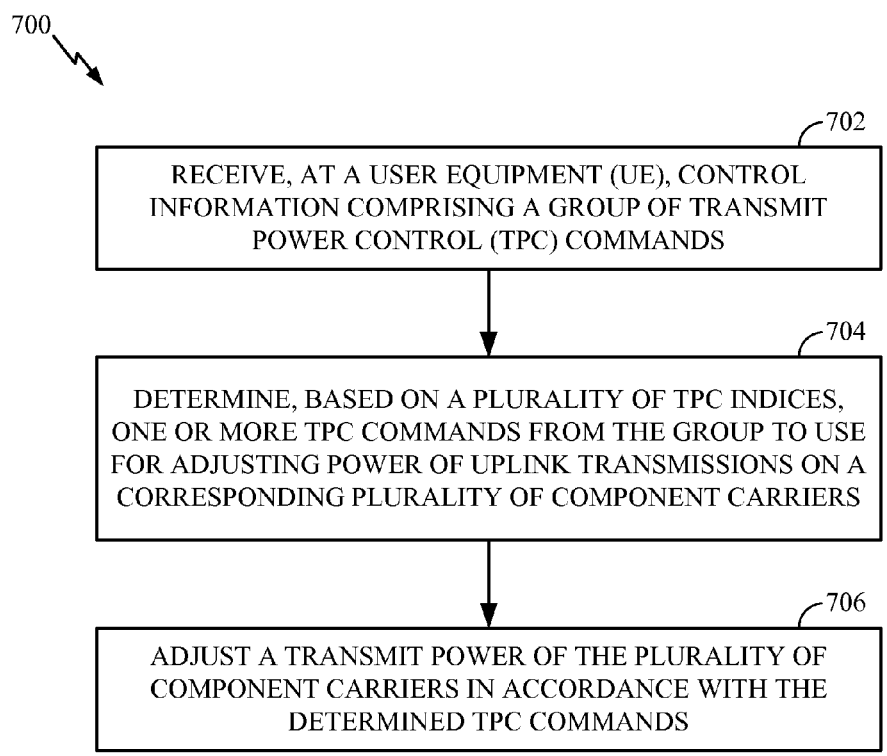
FIG. 7 illustrates example operations that may be performed by a user equipment for power control using power control indices, in accordance with certain aspects of the present disclosure.

FIG. 7 illustrates example operations 700 that may be performed by a user equipment for power control using a TPC index mapping, in accordance with certain aspects of the present disclosure. The user equipment may be as described in connection with any of FIGS. 1-3. For instance, exemplary operations 700 may be directed by one or more processors (such as processor 270), or by one or more components (such as components 316-324).

At 702, the UE receives control information comprising a group of transmit power control (TPC) commands. In one aspect, the UE may receive a DCI format 3/3A message on a physical downlink control channel (PDCCH). At 704, the UE determines, based on a plurality of TPC indices, one or more TPC commands from the group to use for adjusting power of uplink transmissions on a corresponding plurality of component carriers. The one or more TPC commands may be detected at locations in the group power control command indicated by the plurality of TPC indices. At 706, the UE adjusts a transmit power of the plurality of component carriers in accordance with the determined TPC commands. For certain aspects, adjusting the transmit power of the plurality of component carriers may be performed in a substantially concurrent manner.

For certain aspects, the UE may determine an association between each of the plurality of TPC indices and a corresponding one of the plurality of component carriers. The UE may receive an indication of the association via Radio Link Control (RLC) layer signaling. For certain aspects, at least one of the TPC commands may indicate transmit power of one or more corresponding carriers may not be adjusted or for which the adjustment comprises a zero value.

For certain aspects, each TPC index may be associated with at least one of a control channel or a data channel of a corresponding component carrier in the plurality of component carriers. Therefore, the UE may adjust the transmit power of a PUCCH of a first component carrier in response to a TPC command that may have a location in the group of TPC commands determined by a first TPC index. The UE may also adjust the transmit power of a PUSCH of the first component carrier in response to a TPC command that may have a location in the group of TPC commands determined by a second TPC index.

Figure 8:
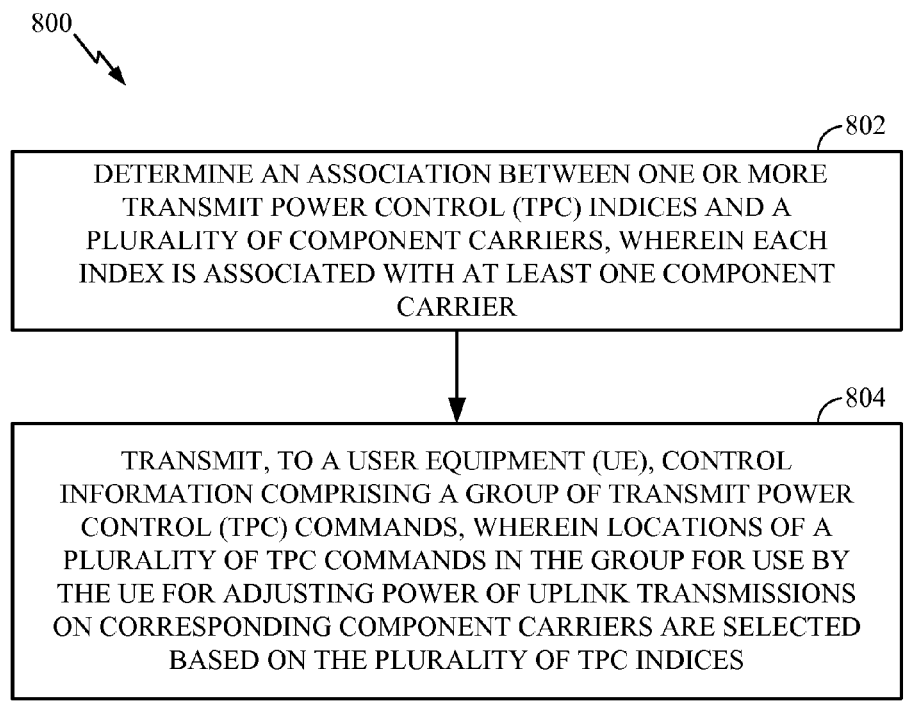
FIG. 8 illustrates example operations that may be performed by an access point for power control using power control indices, in accordance with certain aspects of the present disclosure.

FIG. 8 illustrates example operations 800 that may be performed by an access point (AP) for power control using power control indices, in accordance with certain aspects of the present disclosure. The access point may be as described in connection with any of FIGS. 1-3. For instance, exemplary operations 800 may be directed by one or more processors (such as processor 230), or by one or more components (such as components 306-314).

At 802, the AP determines an association between one or more transmit power control (TPC) indices and a plurality of component carriers, where each index can be associated with one or more component carriers. At 804, the AP transmits, to a user equipment (UE), control information comprising a group of transmit power control (TPC) commands. The locations of a plurality of TPC commands in the group for use by the UE for adjusting power of uplink transmissions on corresponding component carriers are selected based on the plurality of TPC indices.

As described above, according to certain aspects, a TCP command can be targeted to one or more component carriers by using a DCI message for which the cyclic redundancy check (CRC) is scrambled by a predetermined RNTI. The predetermined RNTI can be associated with one or more component carriers for which power is to be adjusted. For example, as shown in FIG. 9, the CRC for DCI formats 0, 1 may be scrambled by Cell-RNTI and CRC for formats 3 and 3A may be scrambled by System Information (SI)/Paging (P)/Random Access (RA) RNTI.

According to aspects of the present disclosure, additional RNTIs may be used for conveying TPC commands which are targeted to individual component carriers or groups of component carriers. The additional RNTIs may also be associated with control or data channels of the targeted carriers. For example, one or more TPC-PUSCH-RNTIs may be used to target physical uplink shared channel transmission power for a first group of component carriers, and one or more TPC-PUCCH-RNTIs may be used to target the transmission power used with the physical uplink control channel of the first group of component carriers. FIG. 10 illustrates an example DCI message 1000, with a CRC scrambled with an RNTI associated with one or more component carriers. The exemplary downlink control information messages 400, 500, 1000 may be utilized in connection with communication system 300. In this example, a UE may determine which component carrier corresponds to a TPC command in the DCI message 1000 based on the RNTI that results in a successful CRC match.

Figure 11:
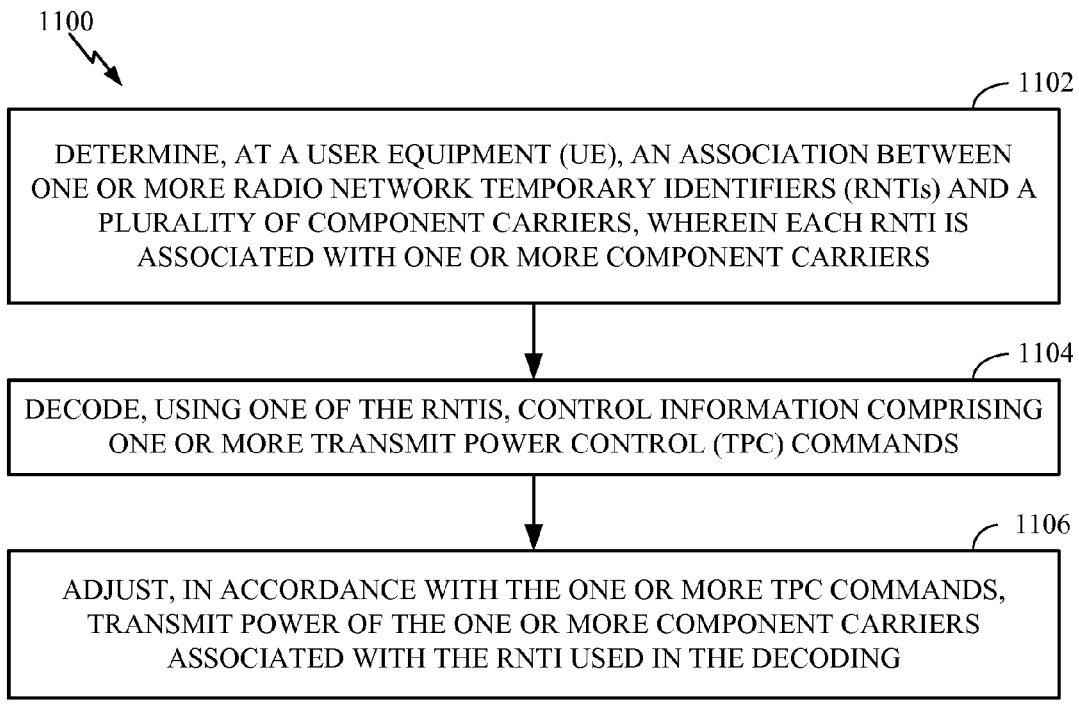
FIG. 11 illustrates example operations that may be performed by a user equipment for power control using identifiers, in accordance with certain aspects of the present disclosure.

FIG. 11 illustrates example operations 1100 that may be performed by a user equipment for power control using identifiers, in accordance with certain aspects of the present disclosure. The user equipment may be as described in connection with any of FIGS. 1-3. For instance, the exemplary operations 1100 may be directed by one or more processors (such as processor 270), or by one or more components (such as components 316-324).

At 1102, the UE determines an association between one or more Radio Network Temporary Identifiers (RNTIs) and a plurality of component carriers, wherein each RNTI is associated with one or more component carriers. At 1104, the UE decodes, using one of the RNTIs, control information comprising one or more transmit power control (TPC) commands. At 1106, the UE adjusts, in accordance with the one or more TPC commands, transmit power of the one or more component carriers associated with the RNTI used in the decoding. For certain aspects, each RNTI may be associated with one or more TPC indices for the one or more component carriers. The one or more TPC indices may be used to locate TPC commands associated with each of the component carriers.

Figure 12:
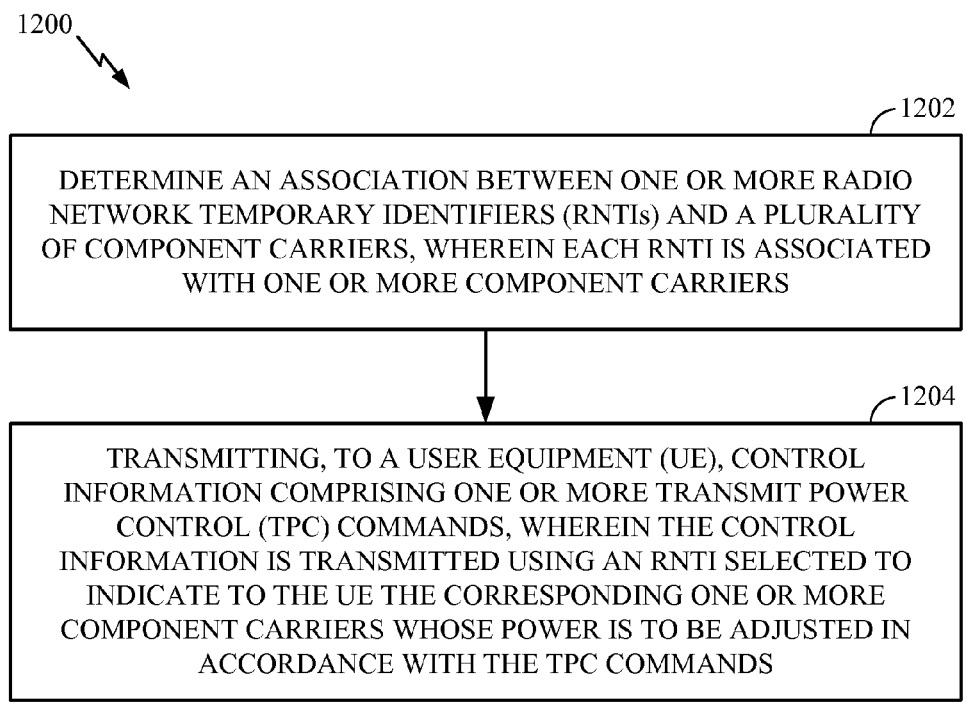
FIG. 12 illustrates example operations that may be performed by an access point for power control using identifiers, in accordance with certain aspects of the present disclosure.

FIG. 12 illustrates example operations 1200 that may be performed by an access point for power control using identifiers, in accordance with certain aspects of the present disclosure. The access point may be as described in connection with any of FIGS. 1-3. For instance, the exemplary operations 1200 may be directed by one or more processors (such as processor 230), or by one or more components (such as components 306-314).

At 1202, the AP determines an association between one or more Radio Network Temporary Identifiers (RNTIs) and a plurality of component carriers, wherein each RNTI is associated with one or more component carriers. At 1204, the AP transmits, to a user equipment (UE), control information comprising one or more transmit power control (TPC) commands, wherein the control information is transmitted using an RNTI selected to indicate to the UE the corresponding one or more component carriers whose power is to be adjusted in accordance with the TPC commands. The selected RNTI may relate to a PUCCH or a PUSCH channel.

Figure 13:
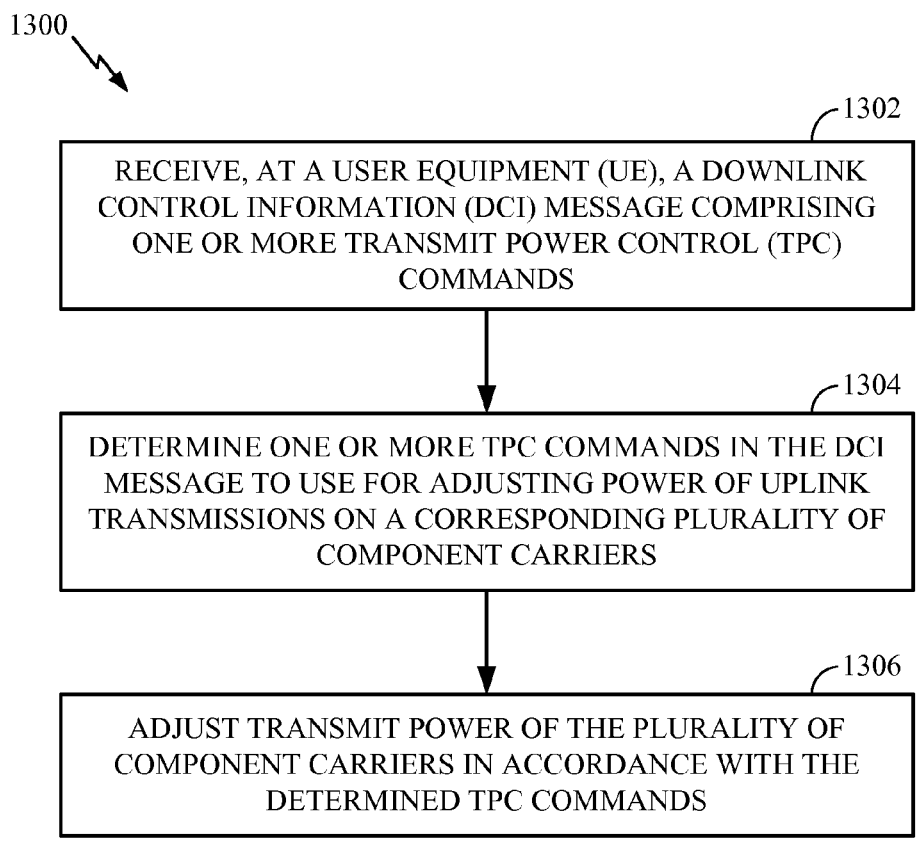
FIG. 13 illustrates example operations that may be performed by a user equipment for power control, in accordance with certain aspects of the present disclosure.

According to additional aspects, rather than utilize mappings of component carriers to indices or RNTI values, as discussed above, other mechanisms may be utilized to convey which TPC command corresponds to which carrier. FIG. 13 illustrates example operations 1300 that may be performed by a user equipment as previously described for receiving power control information. At 1302, the UE receives a downlink control information (DCI) message comprising one or more transmit power control (TPC) commands. At 1304, the UE determines one or more TPC commands in the DCI message to use for adjusting power of uplink transmissions on a corresponding plurality of component carriers. At 1306, the UE adjusts transmit power of the plurality of component carriers in accordance with the determined TPC commands.

For certain aspects, the DCI message may include a downlink grant for a PDSCH and a TPC command may be applied to a PUCCH of an uplink carrier where a control feedback for the granted PDSCH is expected.

Figure 14:
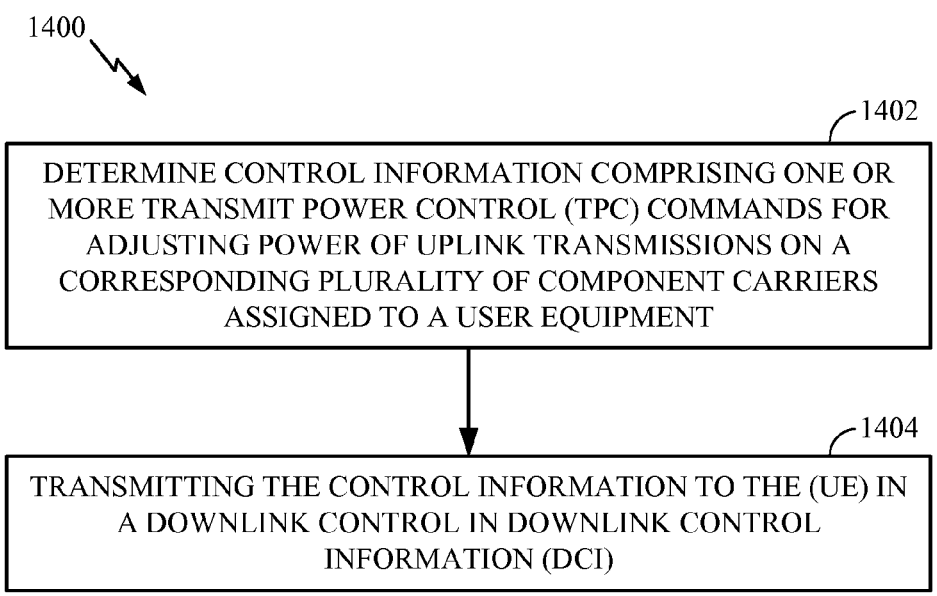
FIG. 14 illustrates example operations that may be performed by an access point for power control, in accordance with certain aspects of the present disclosure.

FIG. 14 illustrates example operations 1400 that may be performed by an access point as previously described for transmitting power control information, in accordance with certain aspects of the present disclosure. At 1402, the AP determines control information comprising one or more transmit power control (TPC) commands for adjusting power of uplink transmissions on a corresponding plurality of component carriers assigned to a user equipment. At 1404, the AP transmits the control information to the UE in a downlink control information (DCI) message.

Power Control Formula

For multicarrier operation, transmit power of each UE for PUSCH transmission in subframe i on a specific carrier c can be defined as follows:

$$P_{PUSCH,c}(i)=\min\{P_{CMAX}, 10\log_{10}(M_{PUSCH,c}(i))+ P_{O\_PUSCH,c}(j)+\alpha_c(j)\cdot PL_c+\Delta_{TF,c}(i)+f_c(i)\} \quad (1)$$

where $P_{CMAX}$ may represent the maximum allowed power configured by higher layers (in SIBS), $M_{PUSCH,c}(i)$ may represent the bandwidth of the PUSCH resource assignment expressed in number of resource blocks valid for subframe i, $P_{O\_PUSCH,c}(j)$ may represent a parameter composed of the sum of cell specific and a UE-specific component provided by higher layers, $\alpha_c(j)$ may represent a 3-bit cell-specific parameter provided by higher layers, $PL_c$ may represent the downlink path loss estimate calculated in the UE in dB, $\Delta_{TF,c}(i)$ may represent a function of the Transport Block Size and the number of resource elements on carrier c, and $f_c(i)$ may represent the current PUSCH power control adjustment state that may be a function of the PUSCH TPC command.

Similarly, the power control formula for PUCCH transmission in subframe i on a specific carrier c may be defined as follows:

$$P_{PUCCH,c}(i)=\min\{P_{CMAX}, P_{O\_PUCCH,c}+PL_c+h_c(n_{CQI}, n_{HARQ}))+\Delta_{F\_PUCCH}(F_c)+g_c(i)\} \quad (2)$$

where $\Delta_{F\_PUCCH}(F_c)$ may represent the parameter provided by higher layers corresponding to a PUCCH format (F) relative to the PUCCH format 1a, h(n) may represent a PUCCH format-dependent value, and $g_c(i)$ may represent the current PUCCH power control adjustment state that may be a function of the PUCCH TPC command. In Equations (1) and (2), all the parameters are carrier-specific (e.g., dependent on the parameter c). However, in some scenarios, some of the parameters may be common across carriers.

Carrier Indication

In a multi-carrier wireless communication system, there may be separate coding of DL assignments and UL assignments for each component carrier. The information may be conveyed to a user equipment by DCI message formats that are designed for a single carrier with an additional carrier indicator field. The carrier indication may be used to explicitly state for which carrier the assignment is intended. Carrier indication may be used for cross-carrier operation, in which assignment for one carrier is transmitted on another carrier. In addition, carrier indication may be used for asymmetric DL/UL configurations, in which number of DL carriers and UL carriers are different (e.g., one DL carrier and multiple UL carriers).

Certain aspects propose number and interpretation of the bits that may be utilized for carrier indication in a multi-carrier system. The DCI formats from the LTE Rel-8 may be augmented with a carrier indicator field that may include one or more bits.

In some scenarios, there may not be a need for transmission of a carrier indicator. Such scenarios may include homogeneous network deployments, systems with symmetric DL/UL carrier configurations, or systems utilizing larger number of DL carriers than the number of UL carriers. If there is no indication of an assigned carrier in the DCI message carrying a downlink assignment, the downlink message may be transmitted on the same DL carrier on which the DCI is transmitted. In case of an uplink assignment through a DCI message without a carrier indicator, an UL carrier uniquely paired with the DL carrier that is carrying the assignment may be used for uplink transmissions.

For certain aspects, for heterogeneous network deployments, additional bits may be included in the assignment DCI in the asymmetric DL/UL carrier configuration (e.g., when one DL carrier is paired with multiple UL carriers). In heterogeneous multicarrier networks, cross-carrier operation may improve reliability of control signals and may enable performing advanced inter-cell interference coordination (ICIC) mechanism.

For certain aspects, number of bits used for the carrier indication and their interpretation may be defined such that the number of bits in the carrier indication field depends on the number of configured carriers for data transmission in the DL and UL channels. For certain aspects, number of bits in the carrier indication field and their interpretation may be specific to each user equipment, and may be determined based on set of configured carriers for physical downlink shared channel (PDSCH) and physical uplink shared channel (PUSCH).

For certain aspects, carrier configuration of a UE may be performed by higher layer signaling. The carrier configuration may include a unique carrier identifier for each configured carrier that may be used to identify/map the carrier in the UL/DL assignment. The carrier identifier mapping may be UE-specific and may be specific to the carrier on which physical downlink control channel (PDCCH) is transmitted.

For certain aspects, number of bits in the carrier indication field and their interpretation may be based on the carrier configuration of a cell (e.g., cell-specific). For example, a UE may implicitly conclude how many bits to expect for carrier indication in the DL/UL assignments based on the number of DL/UL carriers configured for data transmission on DL/UL channels. For certain aspects, a cell may explicitly signal information about the carrier indication field to the UE by higher layer signaling.

For certain aspects, higher layer signaling may be used to configure a UE (e.g., a UE in compliance with the LTE-A) to expect zero or non-zero carrier indication fields in the DL/UL assignments. The number of bits in the carrier indication field and their interpretation may be signaled to a UE by higher layers. For example, a scheduler may signal to a UE whether or not to expect cross-carrier operation (e.g., 3 bits for the carrier indication if cross carrier operation is enabled or zero bit otherwise.) Therefore, the higher layer signaling may be used to determine the operation mode of a UE, such as without cross-carrier operation with zero bit for carrier indication or with cross-carrier operation with a fixed number of bits for carrier indication.

In some cases, optimization of number of bits that are used for carrier indication may not be important. For certain aspects, a UE may be informed by the higher layer signaling whether or not to assume a fixed (e.g., 3) number of bits for carrier indication in the assignments. This would have to be specified for both UL and DL assignments. The operation mode (e.g., with or without cross-carrier operation) may depend on a deployment scenario, as discussed above.

It should be noted that a configurable number of bits for indicating cross-carrier operation may yield very small overhead reduction (e.g., at best 1 vs. 3 bits), which will be at the expense of higher complexity compared to a scheme with fixed number of bits assigned to the carrier indication. Hence, it may be preferred to signal whether or not cross-carrier operation is performed with a fixed number of bits for carrier indication.

To facilitate a common understanding between a scheduler and a UE of the meaning of the carrier indicator bits, a carrier configuration (e.g., a carrier indication message) may include a unique identifier for each carrier that can be used by the UE to identify the carrier. For certain aspects, in order to address more than eight carriers with a 3-bit indicator, a carrier indexing may be specific to the carrier on which the assignment (PDCCH) is transmitted. For example, if there are ten carriers, a UE may address the first five carriers in one carrier assignment and the other five carriers in a second carrier assignment using an indexing from 0-5 in both cases. Using different carrier assignments may also restrict cross-carrier addressing among all configured carriers. It may also reduce the number of blind decoding attempts, for example, if the carrier bandwidths are different for different sets of carriers.

For certain aspects, carrier indicator may be applicable to all of the DCI formats that can carry UE-specific UL or DL assignments. The DCI formats 0, 1, 1A, 1B, 1D, 2, and 2A may be used for UE-specific assignments with Cell Radio Network Temporary Identifier (C-RNTI) scrambling. These formats may be augmented with a carrier indicator field for cross-carrier operation.

The DCI formats 1C, 3, and 3A in the Rel-8 of the LTE standard are not used for UE-specific purposes and may be located in the common search space. In order to provide backward compatibility and co-existence with Rel-8 UEs that may refer to the same common information, DCI formats 1C, 3, and 3A may not include a carrier indicator field.

The DCI formats 1A and 0 may be used for both UE specific and common purposes. For example, if the cross-carrier operation is enabled, a UE may expect the carrier indicator in the format 1A. At the same time, the format 1A may be used for common purposes and hence may be compliant to the Rel-8. Therefore, the DCI formats 1A and 0 may not have a carrier indicator field. This problem is applicable only to the common search space.

For certain aspects, use of DCI formats 0 and 1A in the common search space may only be allowed without the carrier indicator. This restriction could pose some constraints with respect to the use of DCI formats 0/1A. For example, DCI formats 0 and 1A with C-RNTI scrambled cyclic redundancy check (CRC) may not support cross-carrier operation.

For certain aspects, the DCI formats 0 and 1A may be used with or without the carrier indicator in the common search space. For example, the DCI formats 0/1A with carrier indicator would exclusively have the CRC scrambled by C-RNTI, while the DCI format 0 and 1A without the carrier indicator would exclusively have the CRC scrambled by Temporary C-RNTI and System Information (SI)/Paging (P)/Random Access (RA) RNTIs, respectively, as shown in Table 1.

Therefore, a UE may try to decode both DCI formats 0 and 1A with and without carrier indicator field in the common search space. However, the CRC scrambling by C-RNTI may be assumed only for the DCI format 1A with carrier indicator. On the other hand, the CRC scrambling by SI/P/RA-RNTI may be assumed only for the DCI format 1A without carrier indicator. Hence, this approach offers the full flexibility of using the UE-specific DCI formats with cross-carrier indicator in the UE-specific and the common search spaces, with the same false alarm probability and slightly increased number of blind decodes.

FIG. 13 illustrates an example table 1300 that shows applicability of carrier indicator to downlink control information (DCI) formats in release-8 of the LTE standard, in accordance with certain aspects of the present disclosure. As illustrated, The DCI formats 0, 1, 1A, 1B, 1D, 2, and 2A may contain carrier indicator field when the cross-carrier operation is enabled and when used for UE-specific purposes (e.g., CRC scrambled by C-RNTI). The DCI formats 0 and 1A may not contain carrier indicator field when used for common purposes (e.g., CRC scrambled by Temporary C-RNTI and SI/P/RA-RNTI, respectively.) The DCI formats 1C, 3, and 3A may not contain carrier indicator field. The operation mode (e.g., with or without cross-carrier operation) may be an operator choice and may depend on the deployment scenario.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
receiving, at a user equipment (UE), control information comprising a group of transmit power control (TPC) commands;
determining, based on a plurality of TPC indices, locations of one or more TPC commands from the group to use for adjusting power of uplink transmissions on a corresponding plurality of component carriers, wherein each TPC index is associated with at least one of a control channel or a data channel of a corresponding component carrier in the plurality of component carriers; and
adjusting a transmit power of one or more of the plurality of component carriers in accordance with the determined locations.

2. The method of claim 1, further comprising:
determining an association between each of the plurality of TPC indices and a corresponding one of the plurality of component carriers.

3. The method of claim 2, further comprising receiving an indication of the association via Radio Link Control (RLC) layer signaling.

4. The method of claim 1, further comprising:
determining an association between at least one of the plurality of TPC indices and two or more component carriers in the plurality of component carriers.

5. The method of claim 4, wherein adjusting the transmit power comprises adjusting the transmit power of the two or more component carriers based on a single TPC command from the group of TPC commands.

6. The method of claim 1, wherein adjusting the transmit power further comprises:
adjusting the transmit power of a physical uplink control channel (PUCCH) of a first component carrier in response to a TPC command having a location in the group of TPC commands determined by a first TPC index, and
adjusting the transmit power of a physical uplink shared channel (PUSCH) of the first component carrier in response to a TPC command having a location in the group of TPC commands determined by a second TPC index.

7. The method of claim 1, wherein the transmit power of the plurality of component carriers is adjusted in a substantially concurrent manner.

8. The method of claim 1, wherein at least one of the one or more TPC commands indicates transmit power of one or more corresponding carriers is not to be adjusted.

9. A method for wireless communications, comprising:
determining an association between one or more transmit power control (TPC) indices and a plurality of component carriers, wherein each of the one or more TPC indices is associated with at least one component carrier and wherein each of the one or more TPC indices is associated with at least one of a control channel or a data channel of a corresponding component carrier in the plurality of component carriers; and
transmitting, to a user equipment (UE), control information comprising a group of transmit power control (TPC) commands, wherein locations of a plurality of TPC commands in the group for use by the UE for adjusting power of uplink transmissions on corresponding component carriers are selected based on the plurality of TPC indices.

10. The method of claim 9, further comprising transmitting an indication of an association between the one or more TPC indices and the plurality of component carriers via Radio Link Control (RLC) layer signaling.

11. The method of claim 10, wherein the transmitting comprises transmitting an indication of a plurality of TPC indices for a single component carrier.

12. The method of claim 9, wherein the transmitting comprises transmitting an indication of an association between a first TPC index and a first group of component carriers and an association between a second TPC index and a second group of component carriers.

13. The method of claim 12, wherein the transmitting further comprises:
   transmitting, at a first time, control information having a TPC command at the first TPC index for use by the UE for adjusting power of uplink transmissions for the first group of component carriers, and
   transmitting, at a second time, control information having a TPC command at the second TPC index for use by the UE for adjusting power of uplink transmissions for the second group of component carriers.

14. The method of claim 12, wherein at least one of the component carriers is included in both the first group of component carriers and the second group of component carriers.

15. A method for wireless communications, comprising:
   receiving, at a user equipment (UE), a downlink control information (DCI) message comprising one or more transmit power control (TPC) commands and a downlink grant for a downlink channel;
   determining one or more TPC commands in the DCI message to use for adjusting power of uplink transmissions on a corresponding plurality of component carriers configured for the UE; and
   adjusting transmit power of the plurality of component carriers in accordance with the determined one or more TPC commands, wherein the DCI message comprises a plurality of TPC commands, each used to adjust power of a different component carrier configured for the UE, and wherein at least one of the one or more TPC commands is applied to an uplink channel of an uplink carrier where control feedback associated with the downlink grant for the downlink channel is expected.

16. The method of claim 15, wherein:
   the downlink channel comprises a physical downlink shared channel (PDSCH); and
   the uplink channel comprises a physical uplink control channel (PUCCH).

17. The method of claim 15, wherein:
   the DCI message comprises an uplink grant; and
   a TPC command is applied to a physical uplink shared channel (PUSCH) of a carrier for which the uplink grant is intended.

18. An apparatus for wireless communications, comprising:
   means for receiving, at a user equipment (UE), control information comprising a group of transmit power control (TPC) commands;
   means for determining, based on a plurality of TPC indices, locations of one or more TPC commands from the group to use for adjusting power of uplink transmissions on a corresponding plurality of component carriers, wherein each TPC index is associated with at least one of a control channel or a data channel of a corresponding component carrier in the plurality of component carriers; and
   means for adjusting a transmit power of one or more of the plurality of component carriers in accordance with the determined locations.

19. The apparatus of claim 18, further comprising:
   means for determining an association between each of the plurality of TPC indices and a corresponding one of the plurality of component carriers.

20. The apparatus of claim 19, further comprising means for receiving an indication of the association via Radio Link Control (RLC) layer signaling.

21. The apparatus of claim 18, further comprising:
   means for determining an association between at least one of the plurality of TPC indices and two or more component carriers in the plurality of component carriers.

22. The apparatus of claim 21, wherein the means for adjusting the transmit power comprises means for adjusting the transmit power of the two or more component carriers based on a single TPC command from the group of TPC commands.

23. The apparatus of claim 18, wherein the means for adjusting the transmit power further comprises:
   means for adjusting the transmit power of a physical uplink control channel (PUCCH) of a first component carrier in response to a TPC command having a location in the group of TPC commands determined by a first TPC index, and
   means for adjusting the transmit power of a physical uplink shared channel (PUSCH) of the first component carrier in response to a TPC command having a location in the group of TPC commands determined by a second TPC index.

24. The apparatus of claim 18, wherein the transmit power of the plurality of component carriers is adjusted in a substantially concurrent manner.

25. The apparatus of claim 18, wherein at least one of the one or more TPC commands indicates transmit power of one or more corresponding carriers is not to be adjusted.

26. An apparatus for wireless communications, comprising:
   means for determining an association between one or more transmit power control (TPC) indices and a plurality of component carriers, wherein each of the one or more TPC indices is associated with at least one component carrier and wherein each of the one or more TPC indices is associated with at least one of a control channel or a data channel of a corresponding component carrier in the plurality of component carriers; and
   means for transmitting, to a user equipment (UE), control information comprising a group of transmit power control (TPC) commands, wherein locations of a plurality of TPC commands in the group for use by the UE for adjusting power of uplink transmissions on corresponding component carriers are selected based on the plurality of TPC indices.

27. The apparatus of claim 26, further comprising means for transmitting an indication of an association between the the one or more TPC indices and the plurality of component carriers via Radio Link Control (RLC) layer signaling.

28. The apparatus of claim 27, wherein the means for transmitting comprises means for transmitting an indication of a plurality of TPC indices for a single component carrier.

29. The apparatus of claim 26, wherein the means for transmitting comprises means for transmitting an indication of an association between a first TPC index and a first group of component carriers and an association between a second TPC index and a second group of component carriers.

30. The apparatus of claim 29, wherein the means for transmitting further comprises:
   means for transmitting, at a first time, control information having a TPC command at the first TPC index for use by the UE for adjusting power of uplink transmissions for the first group of component carriers, and means for transmitting, at a second time, control information having a TPC command at the second TPC index for use by the UE for adjusting power of uplink transmissions for the second group of component carriers.

31. The apparatus of 29, wherein at least one component carrier is included in both the first group of component carriers and the second group of component carriers.

32. An apparatus for wireless communications, comprising:
means for receiving, at a user equipment (UE), a downlink control information (DCI) message comprising one or more transmit power control (TPC) commands and a downlink grant for a downlink channel;
means for determining one or more TPC commands in the DCI message to use for adjusting power of uplink transmissions on a corresponding plurality of component carriers configured for the UE; and
means for adjusting transmit power of the plurality of component carriers in accordance with the determined one or more TPC commands, wherein the DCI message comprises a plurality of TPC commands, each used to adjust power of a different component carrier configured for the UE, and wherein at least one of the one or more TPC commands is applied to an uplink channel of an uplink carrier where control feedback associated with the downlink grant for the downlink channel is expected.

33. The apparatus of claim 32, wherein:
the downlink channel comprises a physical downlink shared channel (PDSCH); and
the uplink channel comprises a physical uplink control channel (PUCCH).

34. The apparatus of claim 32, wherein:
the DCI message comprises an uplink grant; and
a TPC command is applied to a physical uplink shared channel (PUSCH) of a carrier for which the uplink grant is intended.

35. An apparatus for wireless communications, comprising:
at least one processor configured to
receive, at a user equipment (UE), control information comprising a group of transmit power control (TPC) commands,
determine, based on a plurality of TPC indices, locations of one or more TPC commands from the group to use for adjusting power of uplink transmissions on a corresponding plurality of component carriers, wherein each TPC index is associated with at least one of a control channel or a data channel of a corresponding component carrier in the plurality of component carriers, and
adjust a transmit power of one or more of the plurality of component carriers in accordance with the determined locations; and
a memory coupled to the at least one processor.

36. An apparatus for wireless communications, comprising:
at least one processor configured to
determine an association between one or more transmit power control (TPC) indices and a plurality of component carriers, wherein each index is associated with at least one component carrier and wherein each TPC index is associated with at least one of a control channel or a data channel of a corresponding component carrier in the plurality of component carriers, and
transmit, to a user equipment (UE), control information comprising a group of transmit power control (TPC) commands, wherein locations of a plurality of TPC commands in the group for use by the UE for adjusting power of uplink transmissions on corresponding component carriers are selected based on the plurality of TPC indices; and
a memory coupled to the at least one processor.

37. An apparatus for wireless communications, comprising:
at least one processor configured to
receive, at a user equipment (UE), a downlink control information (DCI) message comprising one or more transmit power control (TPC) commands and a downlink grant for a downlink channel,
determine one or more TPC commands in the DCI message to use for adjusting power of uplink transmissions on a corresponding plurality of component carriers configured for the UE, and
adjust transmit power of the plurality of component carriers in accordance with the determined one or more TPC commands, wherein the DCI message comprises a plurality of TPC commands, each used to adjust power of a different component carrier configured for the UE, and wherein at least one of the one or more TPC commands is applied to an uplink channel of an uplink carrier where control feedback associated with the downlink grant for the downlink channel is expected; and
a memory coupled to the at least one processor.

38. A computer-program product for wireless communications, comprising a non-transitory computer readable medium having instructions stored thereon, the instructions being executable by one or more processors and the instructions comprising:
instructions for receiving, at a user equipment (UE), control information comprising a group of transmit power control (TPC) commands;
instructions for determining, based on a plurality of TPC indices, locations of one or more TPC commands from the group to use for adjusting power of uplink transmissions on a corresponding plurality of component carriers, wherein each TPC index is associated with at least one of a control channel or a data channel of a corresponding component carrier in the plurality of component carriers; and
instructions for adjusting a transmit power of one or more of the plurality of component carriers in accordance with the determined locations.

39. A computer-program product for wireless communications, comprising a non-transitory computer readable medium having instructions stored thereon, the instructions being executable by one or more processors and the instructions comprising:
instructions for determining an association between one or more transmit power control (TPC) indices and a plurality of component carriers, wherein each index is associated with at least one component carrier and wherein each TPC index is associated with at least one of a control channel or a data channel of a corresponding component carrier in the plurality of component carriers; and
instructions for transmitting, to a user equipment (UE), control information comprising a group of transmit power control (TPC) commands, wherein locations of a plurality of TPC commands in the group for use by the UE for adjusting power of uplink transmissions on corresponding component carriers are selected based on the plurality of TPC indices.

40. A computer-program product for wireless communications, comprising a non-transitory computer readable medium having instructions stored thereon, the instructions being executable by one or more processors and the instructions comprising:

instructions for receiving, at a user equipment (UE), a downlink control information (DCI) message comprising one or more transmit power control (TPC) commands and a downlink grant for a downlink channel;

instructions for determining one or more TPC commands in the DCI message to use for adjusting power of uplink transmissions on a corresponding plurality of component carriers configured for the UE; and instructions for adjusting transmit power of the plurality of component carriers in accordance with the determined one or more TPC commands, wherein the DCI message comprises a plurality of TPC commands, each used to adjust power of a different component carrier configured for the UE, and wherein at least one of the one or more TPC commands is applied to an uplink channel of an uplink carrier where control feedback associated with the downlink grant for the downlink channel is expected.

* * * * *